(12) United States Patent
Roberge et al.

(10) Patent No.: US 10,178,180 B2
(45) Date of Patent: Jan. 8, 2019

(54) AIRFLOW DEFLECTOR FOR RADIAL FAN OF AIR SEEDER

(71) Applicant: CNH Industrial Canada, Ltd., Saskatoon (CA)

(72) Inventors: Martin J. Roberge, Saskatoon (CA); Ka Po Catherine Hui, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/454,029

(22) Filed: Mar. 9, 2017

(65) Prior Publication Data

US 2017/0172060 A1 Jun. 22, 2017

(51) Int. Cl.
| | |
|---|---|
| H04L 29/08 | (2006.01) |
| G06Q 30/02 | (2012.01) |
| H04W 4/80 | (2018.01) |
| A01C 7/20 | (2006.01) |
| F15D 1/00 | (2006.01) |
| A01C 7/08 | (2006.01) |

(52) U.S. Cl.
CPC ............ *H04L 67/125* (2013.01); *A01C 7/206* (2013.01); *F15D 1/001* (2013.01); *G06Q 30/0277* (2013.01); *H04L 67/18* (2013.01); *H04W 4/80* (2018.02); *A01C 7/081* (2013.01)

(58) Field of Classification Search
CPC .......... A01C 7/206; A01C 7/081; F15D 1/001
USPC ................... 239/498; 111/174–176, 183–185
See application file for complete search history.

(56) References Cited

U.S. PATENT DOCUMENTS

| | | | | | |
|---|---|---|---|---|---|
| 2,079,203 | A | * | 5/1937 | Fagerburg | ................. B60S 1/54 359/509 |
| 2,445,606 | A | * | 7/1948 | Davis | ...................... B60R 13/00 248/231.81 |
| 2,841,440 | A | * | 7/1958 | Werner | ....................... B60J 1/14 296/152 |
| 3,427,067 | A | * | 2/1969 | Kish | ...................... B60J 1/2008 296/91 |
| 3,785,699 | A | * | 1/1974 | Molaskey | .............. B60J 1/2002 296/152 |
| 4,347,781 | A | * | 9/1982 | Hassell | ...................... B60J 1/20 296/152 |
| 6,668,738 | B2 | | 12/2003 | Lee | |

\* cited by examiner

*Primary Examiner* — Chee-Chong Lee
(74) *Attorney, Agent, or Firm* — Rebecca L. Henkel; Rickard K. DeMille

(57) ABSTRACT

A pneumatic system of an agricultural implement includes a radial fan coupled with a plenum. The plenum contains outlets which distribute the airflow into a plurality of product distribution lines for application to a field. An airflow deflector plate has a back face fixed on a sidewall of a region interconnecting the fan outlet and plenum inlet to modify the airflow pattern and obtain an airflow that is at a uniform pressure and flow rate for each product distribution line. The deflector plate is tapered with a narrow edge pointed upstream and includes front face having at least one generally rectangular groove with a bottom surface extending generally parallel to the deflector back face.

4 Claims, 6 Drawing Sheets

AIRFLOW DEFLECTOR FOR RADIAL FAN OF AIR SEEDER

CROSS REFERENCE TO RELATED APPLICATIONS

This is a non-provisional divisional application based upon and having priority from U.S. non-provisional patent application Ser. No. 14/495,293, entitled, "AIRFLOW DEFECTOR FOR RADIAL FAN OF AIR SEEDER," filed Sep. 24, 2014, which is hereby incorporated by reference herein in its entirety.

BACKGROUND OF THE INVENTION

1. Field of the Invention

The present invention relates to farm implements and, more particularly, to an apparatus for supplying particulate material such as seed, fertilizer, herbicide or insecticide to one or more tanks of an air seeder. The invention may also be used with other farm implements having pneumatic material conveying systems such as a planter or fertilizer application equipment.

2. Description of the Related Art

Air seeder systems include a traction unit with an air cart in tow and frequently include a third unit such as a cultivator either between the traction unit and air cart, or towed behind the air cart. Agricultural implements that employ an air seeder system to apply seed, fertilizer, or other particulate material, either sub-surface or to the surface of a farm field, typically have a material supply source such as one or more tanks that are loaded with the particulate material. The tanks have or are associated with a metering device, which typically consists of a rotating element, which meters the particulate material from the tanks into a set of distribution channels, such as conduits, hoses, etc., for application to the farm field. In most systems, a pneumatic source such as a fan or blower provides air to convey and distribute material through the distribution channels. Some row planters employ a similar air distribution system to supply seeds to the individual row unit hoppers.

In some cases, the apportionment of airflow among the distribution channels is uneven. By design, some fans, radial fans for example, produce an uneven distribution of air near the outlet. The uneven distribution leads to skewed distribution profiles for pressure and flow rate at the outlet of the fan's plenum. This can lead to preferential air flow, uneven seed distribution during seeding and could cause plugging of seed lines.

A uniform air flow profile and a concave profile for pressure distribution would be ideal. These two profiles are not identical. To meter a specified amount of product, a minimum level of air flow needs to be met in all distribution lines. Some distribution lines are longer and those lines require more pressure to combat the hose length dependent pressure loss.

What is needed in the art is an air distribution system which meets the forgoing requirements.

SUMMARY OF THE INVENTION

The present invention provides a solution to these drawbacks by including an airflow deflector at the fan outlet to better balance out the pressure and airflow profiles from left to right. This deflector contains grooves to induce mostly vertical mixing of airflow near the fan outlet, to better balance the pressure and airflow profiles vertically.

The invention in one form is directed to a pneumatic agricultural product conveying system which has at least one agricultural product supply chamber with a pneumatic source including an air inlet and an air outlet. There is a plenum with an inlet for receiving airflow from the pneumatic source outlet with outlets at the downstream end thereof. A plurality of distribution lines extend from the plenum outlets to a utilization implement for applying air entrained product to an agricultural field. A metering device meters agricultural product from the supply chamber to the distribution lines. A wedge-shaped airflow deflector at the pneumatic source outlet or at the plenum inlet modifies the airflow pattern exiting the pneumatic source as it enters the plenum to improve the distribution of the pressure and flow profiles from left to right, and top to bottom.

The invention in another form is directed to an air system which supplies a flow of air entrained agricultural product from a product tank to be applied to an agricultural field. The system has a pneumatic product conveying feature with a pneumatic source having an air inlet and an air outlet. There is a plenum having an inlet for receiving airflow from the pneumatic source air outlet with outlets at the downstream end thereof. A plurality of distribution lines extend from the plenum outlets for supplying air entrained product to be dispensed to an agricultural field. A wedge-shaped airflow deflector modifies the airflow pattern as it enters the plenum to provide a more uniform distribution of product among the distribution lines.

Further in general, and in one form of the invention, a generally rectangular airflow deflector plate for placement on one sidewall of an air conveying duct of generally rectangular cross-section more uniformly distributes airflow within a chamber downstream of the duct. The duct is a region of generally rectangular cross-sectional configuration coupling the pneumatic source outlet and the plenum inlet and may simply be a portion of the fan outlet, or a portion of the plenum inlet. The deflector plate has a front face, a back face, a narrow upstream edge, a wider downstream edge and a pair or opposed generally triangular ends. The airflow deflector front face includes at least one generally rectangular groove having a bottom surface extending generally parallel to the deflector back face An advantage of the present invention is an airflow that is at a nearly constant flow rate for each hose.

Another advantage is better balanced airflow profiles both vertically and from left to right providing a better balance in terms of air flow and allowing plenum installation in either of two 180 degree apart orientations.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
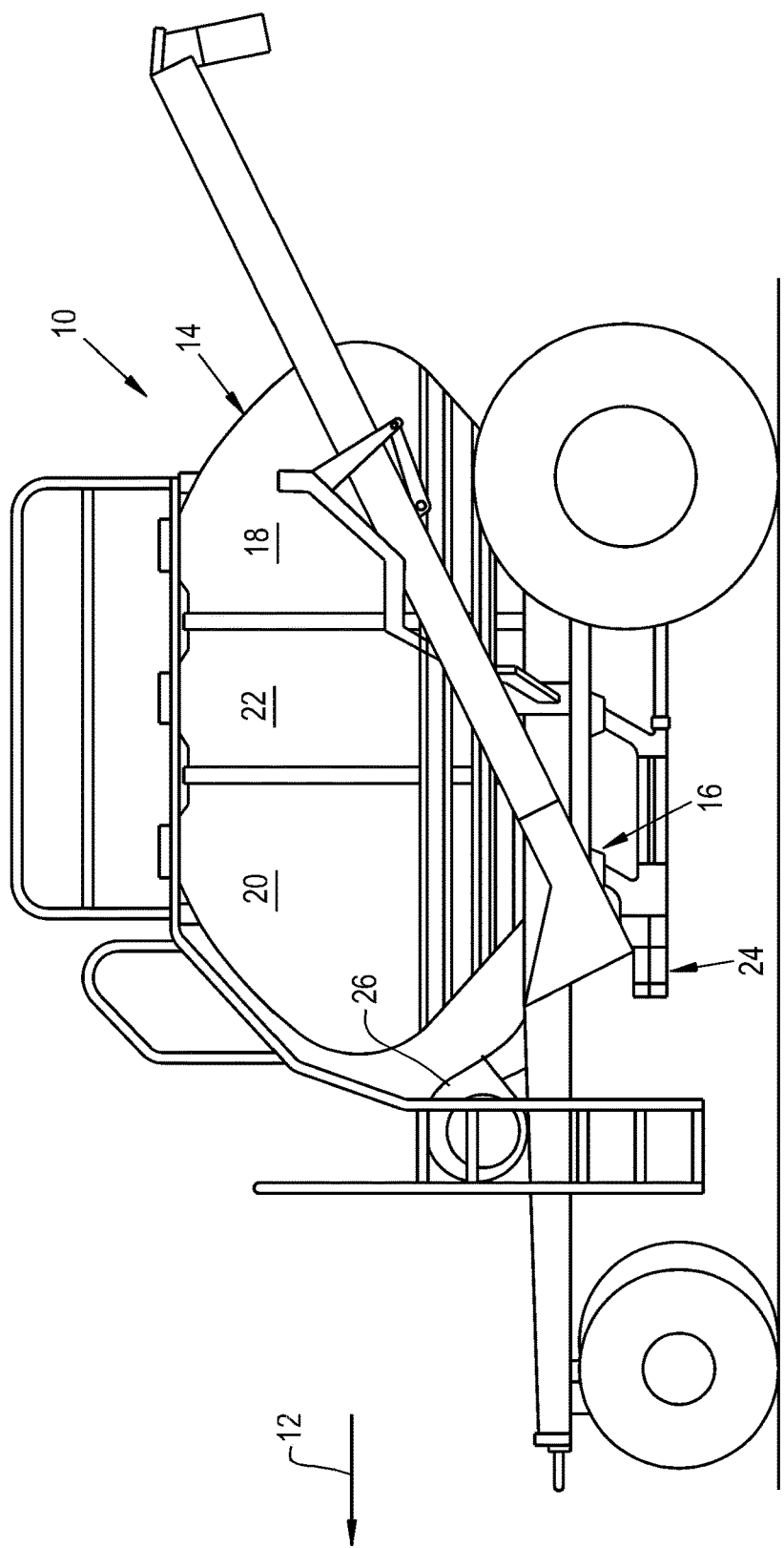
FIG. 1 is a side view of an air cart part of an air seeder equipment, and may include a pneumatic agricultural product conveying system according to the present invention.

Referring now to the drawings, and more particularly to FIG. 1, there is shown an air cart comprising a portion of a known pneumatic agricultural product distribution system which generally includes a traction unit (not shown) which may be coupled to air cart 10 for towing the air cart 10 in the direction of arrow 12. The system usually includes as a third unit, a utilization implement such as an air drill (not shown) for seeding, cultivating and/or fertilizing operations. Air carts can be tow-between or tow-behind the traction unit and air drill. A tow-between cart has the advantage of the drill being the last implement over the field and do not leave tire prints behind. A tow-behind cart has the advantage of the drill being closer to the traction unit for improved viewing of the seeding operation. As is known in the art, the air cart 10 has one or multiple large tanks 14 which store a certain quantity of particulate material, e.g., seed and/or innoculant, or fertilizer, and a metering system 16 that meters the particulate material from the tank or tanks 14 to the air drill. The tank 14 may comprise a single compartment or several compartments, such as 18, 20, and 22. Multiple compartment tanks provide the option of performing multiple operations, e.g., seeding and fertilizer application in a single pass. In addition to being mechanically linked with the air drill, the air cart 10 and the air drill are interconnected by an air/product delivery system which includes tubing and/or hoses as distribution lines 24. Air is supplied to the product delivery system via a manifold or plenum from a fan assembly 26 sometimes mounted adjacent the front of the tank 14 and near the metering unit 16. Alternately, the fan assembly 26 may be mounted rearward of the tank or adjacent a side of the tank. As known in the art, the fan creates a turbulent airflow that carries particulate material metered by metering system 16 into and along distribution lines 24 to the utilization implement for applying the air entrained product to an agricultural field.

Figure 2:
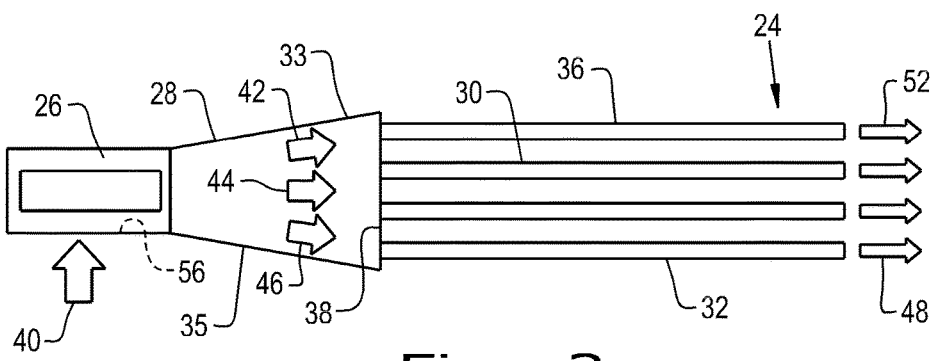
FIG. 2 is a top schematic representation of a pneumatic agricultural product conveying system incorporating the present invention in one form.
Figure 3:
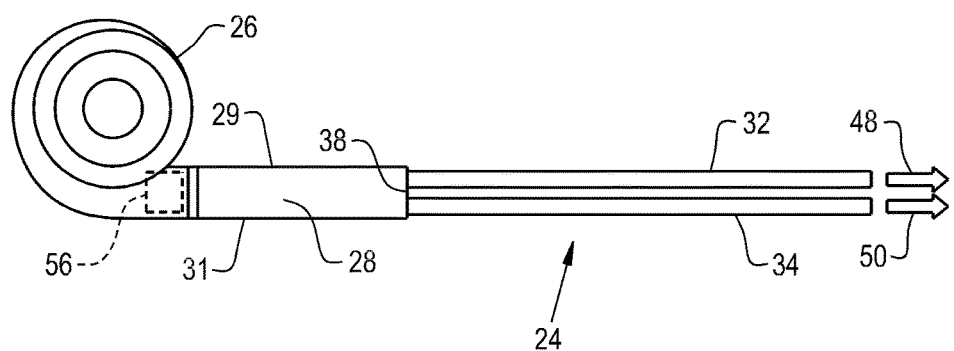
FIG. 3 is a side schematic representation of the pneumatic agricultural product conveying system of FIG. 2.

Referring now to FIGS. 2 and 3, during normal operation for material distribution from the tank 14, air flows from the fan assembly 26 to the plenum 28. Fan assembly 26 is illustrated as a radial fan. The plenum is defined in part by top 29 and bottom 31 walls and a pair of diverging sidewalls 33 and 35. Particulate material is delivered from a metering device, such as 16 of FIG. 1, to the several air/product distribution lines such as 30, 32, 34 and 36. Note in FIGS. 2 and 3 there are two rows of four distribution lines exiting the plenum 28. These distribution lines are fed from an outlet 38 at the downstream end of the plenum 28. Air inlet to the fan is shown by arrow 40. The outlet air from the fan distributes or spreads in plenum 30 as illustrated by arrows 42, 44 and 46. The air entrained agricultural product flows through the distribution lines as shown by arrows 48, 50 and 52. The fan 26 and/or plenum 28 may be mounted up side down from the orientation illustrated in FIGS. 2 and 3.

Figure 4:
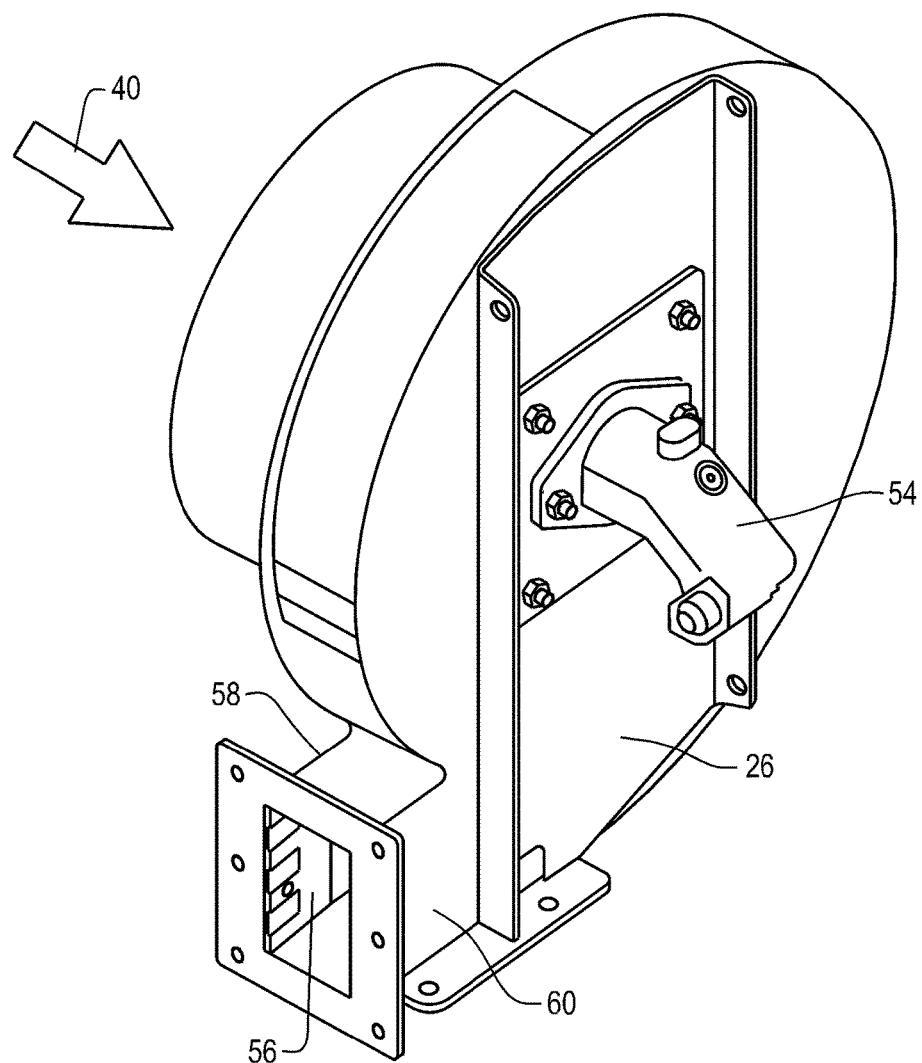
FIG. 4 is an isometric view of the fan portion of the system of FIGS. 2 and 3.
Figure 5:
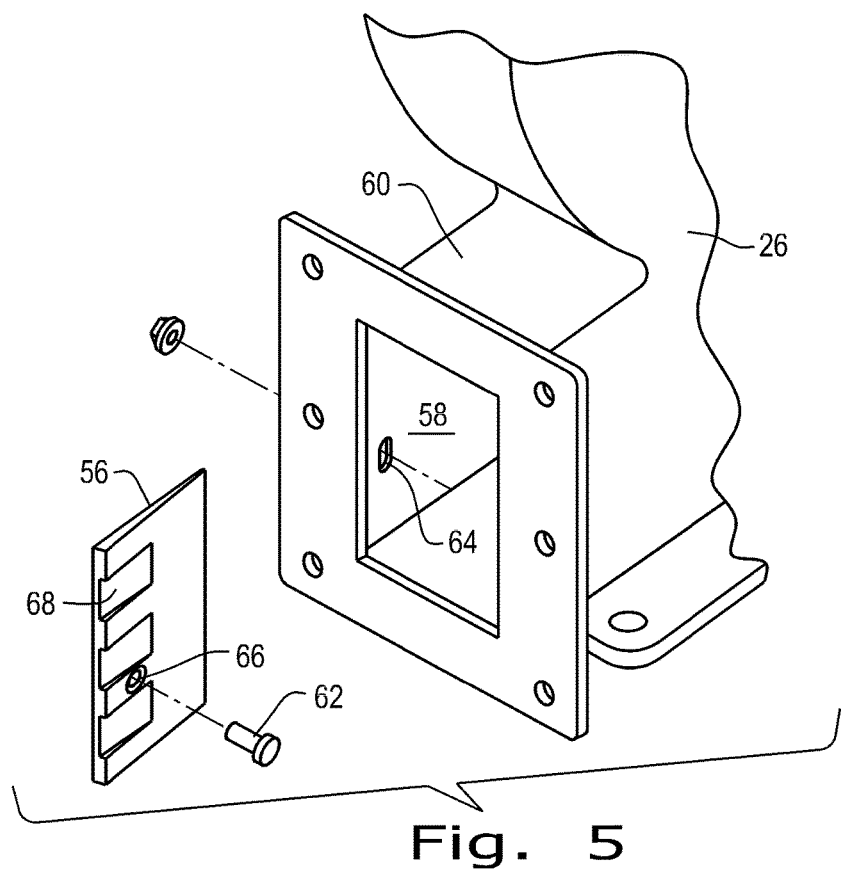
FIG. 5 is a fragmentary exploded isometric view of the air outlet portion of the fan of FIG. 4 showing the deflector plate removed.
Figure 6:
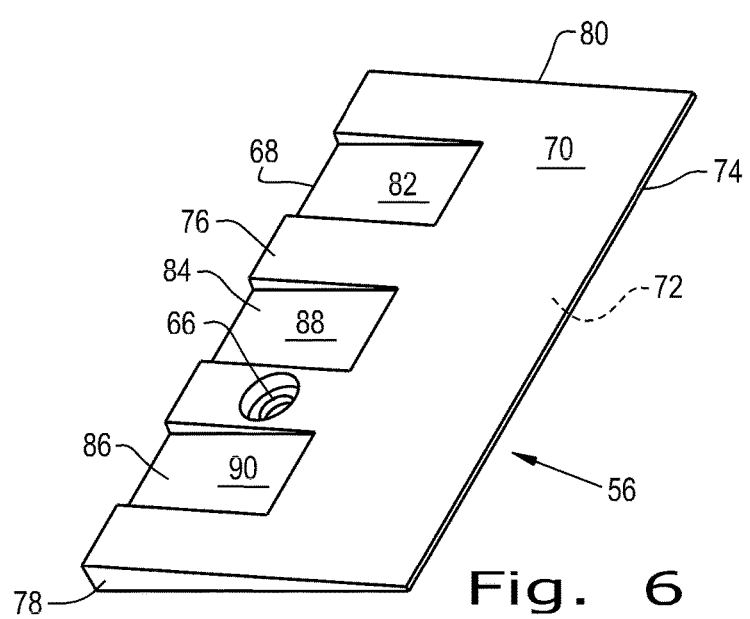
FIG. 6 is an isometric view of the deflector plate of FIGS. 4 and 5.
Figure 8:
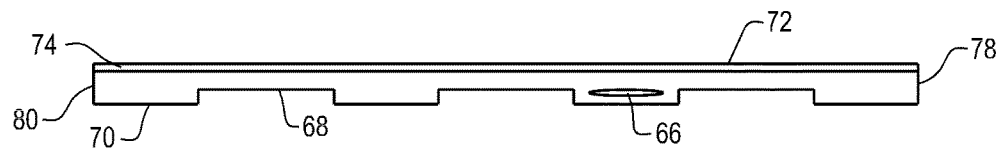
FIG. 8 is an edge view of the deflector plate from the narrow edge thereof.
Figure 9:
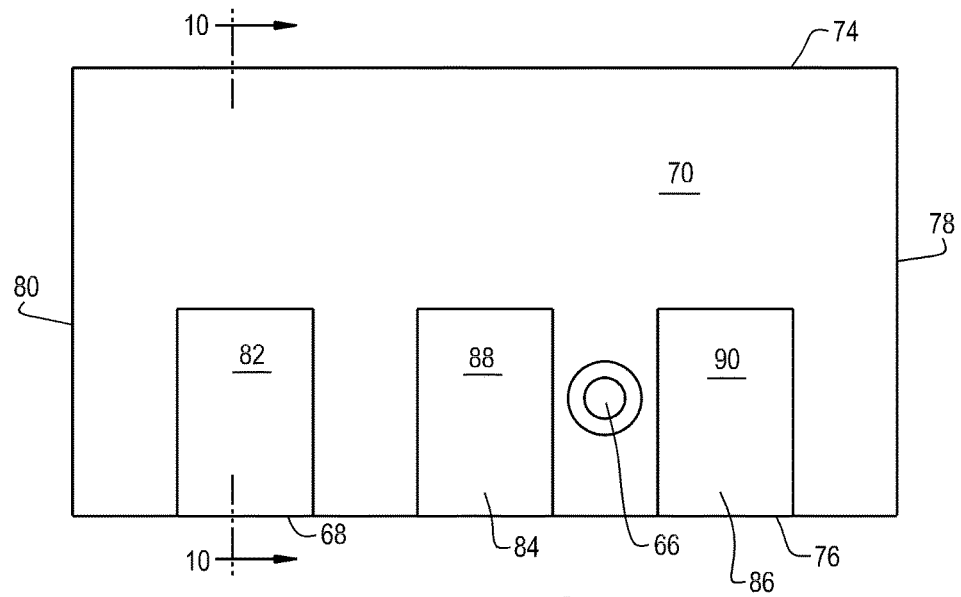
FIG. 9 is a plan view of the front face of the deflector plate.
Figure 7:
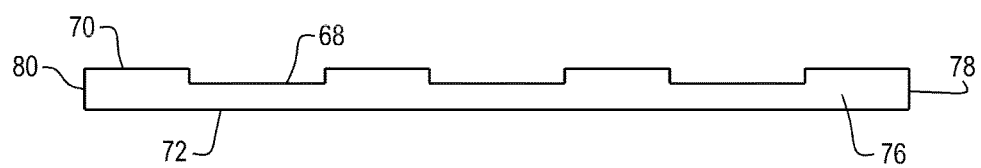
FIG. 7 is an edge view of the wider edge of the deflector plate.
Figure 10:
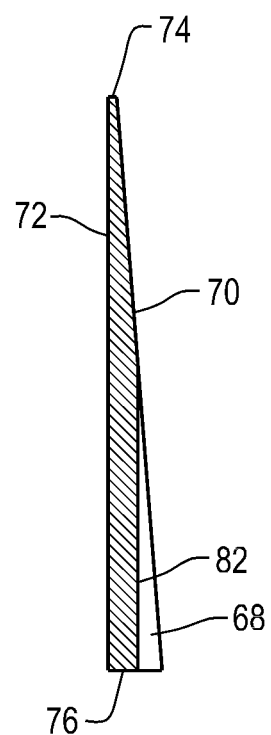
FIG. 10 is a cross-sectional edge view of the deflector plate along lines 10-10 of FIG. 9.

FIG. 4 shows a fan 26 powered by a hydraulic motor 54. The fan housing design may cause the drawback of a somewhat non-uniform outlet airflow pattern. Air flow and pressure profile improvement is achieved by including the flow deflector 56 on one sidewall 58 of the generally rectangular fan outlet 60 as seen in FIGS. 4 and 5. The deflector 56 is fixed to sidewall 58 by any suitable technique, for example, by a threaded fastener 62 which passes through apertures 64 and 66. The diverging plenum sidewall 35 (FIG. 2) connects with the sidewall 58 to which the airflow deflector is fixed. The pneumatic source inlet indicated by the arrow 40 (FIG. 2) and the sidewall 58 to which the airflow deflector 56 is fixed are on the same lateral side of the system, however, mounting the deflector on the opposite lateral sidewall may be preferred in some cases. This deflector may also contain grooves such as 68 to induce mixing of airflow near the fan outlet, to better balance the pressure and airflow profiles vertically.

The deflector structure is best seen in FIGS. 6-10. The deflector plate has a front face 70, a back face 72, a narrow edge 74, a wider edge 76 and a pair or opposed generally triangular ends 78 and 80. The airflow deflector front face 70 has at least one generally rectangular groove 68 having a bottom surface 82 extending generally parallel to the deflector back face. Three grooves 68, 84 and 86 are shown with each of the groove bottom surfaces 82, 88, 90 extending from the wider edge 76 and terminating about midway between the wider edge and the narrow edge 74. Each groove bottom surface lies in generally the same plane and parallel to the back face 72. The back face is fixed to one wall 58 (FIGS. 4 and 5) of the fan outlet 60 with the narrow edge 74 upstream of the wider edge.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A wedge-shaped airflow deflector connected to one sidewall of an air conveying system contained within an agricultural product conveying system which includes an airflow source having an air outlet, the wedge-shaped airflow deflector configured to more uniformly distribute airflow within a chamber of the agricultural product conveying system, the chamber carrying air entrained agricultural product downstream of the wedge-shaped airflow deflector, the wedge-shaped airflow deflector comprising a front face, a back face, a first edge, a second edge that is wider than the first edge, and a pair of opposed spaced-apart triangular ends, the wedge-shaped airflow deflector front face including a plurality of spaced-apart rectangular grooves, each rectangular groove of the plurality of spaced-apart rectangular grooves having a bottom surface extending parallel to the deflector back face, each bottom surface of each rectangular groove extending from the second edge and terminating midway between the second edge and the first edge,
    wherein the back face of the wedge-shaped airflow deflector extends upstream in the air conveying system.

2. The wedge-shaped airflow deflector of claim 1, wherein the plurality of spaced-apart rectangular grooves induce mixing of airflow at the air outlet to balance pressure and airflow profiles.

3. The wedge-shaped airflow deflector of claim 2, wherein the wedge-shaped deflector modifies an airflow pattern entering the chamber to improve distribution of pressure and airflow profiles from left to right, and top to bottom.

4. The wedge-shaped airflow deflector of claim 3, wherein the airflow source comprises a radial fan.

* * * * *